(12) United States Patent
Zubairi

(10) Patent No.: US 8,239,316 B2
(45) Date of Patent: *Aug. 7, 2012

(54) PROCESSING OF DEAL TICKETS

(75) Inventor: Nasir Ahmed Zubairi, New York, NY (US)

(73) Assignee: EBS Group Limited (GB)

( * ) Notice: Subject to any disclaimer, the term of this patent is extended or adjusted under 35 U.S.C. 154(b) by 101 days.

This patent is subject to a terminal disclaimer.

(21) Appl. No.: 12/641,516

(22) Filed: Dec. 18, 2009

(65) Prior Publication Data

US 2010/0145845 A1    Jun. 10, 2010

Related U.S. Application Data

(63) Continuation of application No. 10/548,949, filed as application No. PCT/GB2004/001339 on Mar. 29, 2004, now Pat. No. 7,660,760.

(60) Provisional application No. 60/458,882, filed on Mar. 28, 2003.

(51) Int. Cl.
G06Q 40/00      (2012.01)
(52) U.S. Cl. .......................................... 705/37; 705/35
(58) Field of Classification Search .................... 705/37, 705/35
See application file for complete search history.

(56) References Cited

U.S. PATENT DOCUMENTS

| | | | |
|---|---|---|---|
| 4,677,552 A * | 6/1987 | Sibley, Jr. ........................ | 705/37 |
| 5,003,473 A * | 3/1991 | Richards ........................... | 705/37 |
| 5,793,381 A | 8/1998 | Edberg et al. | |
| 2002/0023045 A1 | 2/2002 | Feilbogen et al. | |
| 2002/0103732 A1 | 8/2002 | Bundy et al. | |
| 2004/0186806 A1 | 9/2004 | Sinclair et al. | |

FOREIGN PATENT DOCUMENTS

| WO | WO-01/059661 A | 8/2001 |
|---|---|---|
| WO | WO-01/059661 A2 | 8/2001 |

OTHER PUBLICATIONS

William Pesek Jr.. (1994, Apr. 25). Trust and Investments: Trading Systems—Global Network Helps KeepSwiss Bank Corp. on Top of Its Deals. American Banker (pre-1997 Fulltext),p. 4A. Retrieved Apr. 26, 2012.*
Dealhub: Digital Dealing Solutions; Feb. 10, 2003; XP002289979; Retrieved from the internet at URL http://web.archive.org/web/20030210111141/http://www.dealhub.com on Jul. 26, 2004; pp. 1-16.
Dealhub: Case Study: Major international bank cuts costs for internal FX dealing; www.Dealhub.com; Nov. 28, 2002; pp. 1-9; XP002289980; retrieved from the internet at URL http://www.im365.org/pdf/imcs.pdf on Jul. 26, 2004.
Vincent P. Annunziata. (Sep. 2001). Straight-through processing. Energy Markets: Dot.Com for Energy, 7. Retrieved Sep. 23, 2009.

* cited by examiner

*Primary Examiner* — Kito R. Robinson
(74) *Attorney, Agent, or Firm* — Dickstein Shapiro LLP

(57) ABSTRACT

A deal feed system for passing deal tickets to back office systems comprises a deal feed contributor which receives tickets from trades on a plurality of trading systems on a plurality of trading floors, a database for storing the tickets, and a distributor for passing the tickets to back office systems. Virtual deal codes are defined to which a plurality of real deal codes map. The virtual deal codes to which a ticket relates is stored in a table with a reference to the stored ticket. A deal code table is updated with the range of the virtual deal code and the update transmitted to the bank office systems and to traders.

17 Claims, 8 Drawing Sheets

PROCESSING OF DEAL TICKETS

CROSS REFERENCE TO RELATED APPLICATIONS

This application is a continuation of U.S. application Ser. No. 10/548,949, filed Sep. 15, 2005, the entirety of which is incorporated herein, which is a National Stage filing under 35 U.S.C. §371 of International Application No. PCT/GB2004/001339, filed on Mar. 29, 2004, which designated the United States and which was in the English language, and claims priority benefit from U.S. Provisional Application No. 60/458,882, filed on Mar. 28, 2003.

FIELD OF THE INVENTION

This invention relates to the processing of deal tickets, produced by trading systems, for example for sending to back office systems of banks and other financial institutions. It is specifically concerned with the manner in which the details of deals are communication to back office systems.

BACKGROUND TO THE INVENTION

Financial institutions trade many different instruments using many different trading systems. In addition, an institution may have many different trading floors, sometimes located in different countries. In the context of the foreign exchange spot market (FX spot), traders use two main trading system providers, EBS (provided by EBS Dealing Resources Inc.) and Reuters (provided by Reuters plc). These two systems operate completely independently of each other and, when a trade is completed, produce deal tickets which are sent to the back office systems of the counterparties to the deals. Deal tickets are proof that a deal has been entered into by two counterparties and are the means used by the banks to settle with counterparties. Deal tickets also allow reconciliation in the event of any doubt or dispute over a trade. The deal ticket will include an identification of the parties and the deal code: a combination of a bank identifier and a trading system identifier; together with details of the trades such as which party acted as maker and taker, the buy/sell price, the currency and the amount. All counterparties trading on systems such as the Reuters and EBS systems mentioned above are allocated a four letter deal code. This may be a unique code for the bank, in the case of smaller institutions, or may identify a particular trading floor within a bank. The deal tickets further are required to identify the trading system to which they relate and are supplied over a physically separate feed for each trading system on each floor. The feed is in one of a number of established formats. For example, feeds from a Reuters system are in Reuters TOF (Ticket Output Feed) & TOF over 18 format, whereas EBS deals are in ASI (Automated System Interface) format. A bank that trades in the FX markets only using Reuters Dealing 3000 (combined anonymous matching and direct dealing system) and EBS spot matching and EBS Trader Direct Dealing for its foreign exchange products will therefore require three separate deal feed lines for each trading floor. However, large banks will have many trading floors and the back office systems will have cabling for each trading system operated by each trading floor which may include systems trading many other products. The amount of cabling required is extremely inconvenient and extremely expensive. For example, the Reuters TOF protocol requires a separate serial line for each deal code/trading system combination. An attempt to reduce the cabling requirement at back offices has been made by OCL (Options Computers Limited) who provide a product under the trademark DealHub. DealHub is a physical interface which receives inputs from all trading floors and provides a single output to the back office systems. DealHub provides separate servers for both EBS and Reuters Deals and can concatenate multiple input feeds from each system into a single data flow. The servers continuously monitor the data flow from the Reuters TOF and EBS ASI feeds respectively and convert the raw data into data records suitable for trader and back office applications. The DealHub system is useful for reducing the amount of physical cabling required to provide deal related data to back office systems. However, it still requires inputs from all the trading systems operated by all the trading floors of a bank and considerable investment in DealHub hardware and software.

The present invention aims to simplify greatly the provision of deal tickets from trading systems to back office systems. In its broadest form, the invention provides a single deal code for all systems operated by all trading floors of an institution. This code is a virtual deal code to which all real trading floor/trading system codes are attached as children. It can be processed on a single line eliminating the need for separate cabling for each trading floor deal code/trading system combination.

Embodiments of the invention have the advantage that the need for individual cabling from each system operated by each trading floor is avoided. Alternatively, the need for an interface accepting inputs from each trading system on each trading floor, as discussed above, is avoided. Embodiments of the invention greatly simplify the provision of deal tickets to back office systems and so greatly reduce the costs to financial institutions and to trading system providers.

Embodiments of the invention also have the advantage that clients can receive a single range of sequence numbers for deal tickets from different trading systems and or deal codes. This avoids the need for reconciliation by back office systems.

More specifically, the invention provides a method of distributing deal information relating to trades conducted by trading floors on trading systems, each trading floor having a deal code unique to the floor and the system on which the trade is made, the method comprising: defining a virtual deal code to which deal codes of a plurality of trading floors and/or trading systems map, the virtual deal code having an associated deal range.

The invention also provides a system for transmission of deal information relating to trades conducted by trading floors on trading systems to back office systems, wherein deal information is passed from the trading system to a deal feed system, the deal feed system comprising means for defining virtual deal codes to which deal codes of a plurality of trading floors and/or trading systems map, the virtual deal codes each having an associated deal range.

Preferably deal information is transmitted to a virtual deal code within the deal range of that virtual deal code.

Preferably, deal tickets are received from a trading system at the contributor of a deal feed system. The deal tickets include a deal code which identifies the sending trading floor and the trading system on which the deal was conducted. A virtual deal code which maps on to the deal code of the received deal ticket is retrieved and the deal ticket is stored with a reference to the virtual deal code.

Preferably, the deal tickets are stored in a deal ticket table at a database. This database also includes a virtual deal ticket table and a deal code table. A reference to the deal ticket is stored in the virtual deal ticket table with the virtual deal code, and the deal code table is updated to be within the range of the virtual deal code. The updates to the deal code table are distributed to back office systems under the virtual deal codes. This may be via a single socket or serial connection.

Preferably the virtual deal code is configured similarly to a real deal code and includes a virtual trading system name and a virtual deal code name.

In one preferred embodiment of the invention a deal feed system comprises a contributor for receiving deal tickets, a distributor for distribution of deal information to back office systems and a database. The database has a deal ticket table which stores the deal tickets, a deal code table referenced to the deal ticket table for storing the deal code to which the ticket relates and a leg table for storing leg information. Additionally a virtual deal ticket table stores a virtual deal code with a reference to the ticket in the ticket table, together with an RSN number within the range of the virtual deal code. The deal code table for the ticket is updated so that the deal range is that of the virtual deal code. A virtual deal code is a label which references a number of actual deal codes, each of which comprises a trading floor identifier and a trading system identifier. When a deal ticket is received by the deal feed system, the system looks for a virtual deal code to which that deal code maps.

Embodiments of the invention have the advantage that deal tickets from a number of different trading systems on a number of different trading floors can be sent to back office systems via a single socket or serial connection. This avoids the need for large numbers of parallel connections required by prior art systems, making processing at the back office more simple and greatly reducing infrastructure costs.

Embodiments of the invention will now be described, by way of example only, and with reference to the accompanying drawings in which.

The invention contemplates the use of a super or virtual deal code which encompasses all trading systems used by all trading systems of an institution. On the face of it, a simple solution to the problem addressed would be to use a simple single adapter. However, this solution is unable to provide a dynamic reproducible range that combines several Trading System/Deal codes together. An adapter making such a combination into a single logical deal code must store the reference originally presented to the back office systems so that the same ticket is returned if the client ever asks for it again. Thus, any simple adapter that interfaces with a deal feed system will require an additional database to store the references and the simple adapter becomes an expensive resource. Clearly this is undesirable.

Figure 1:
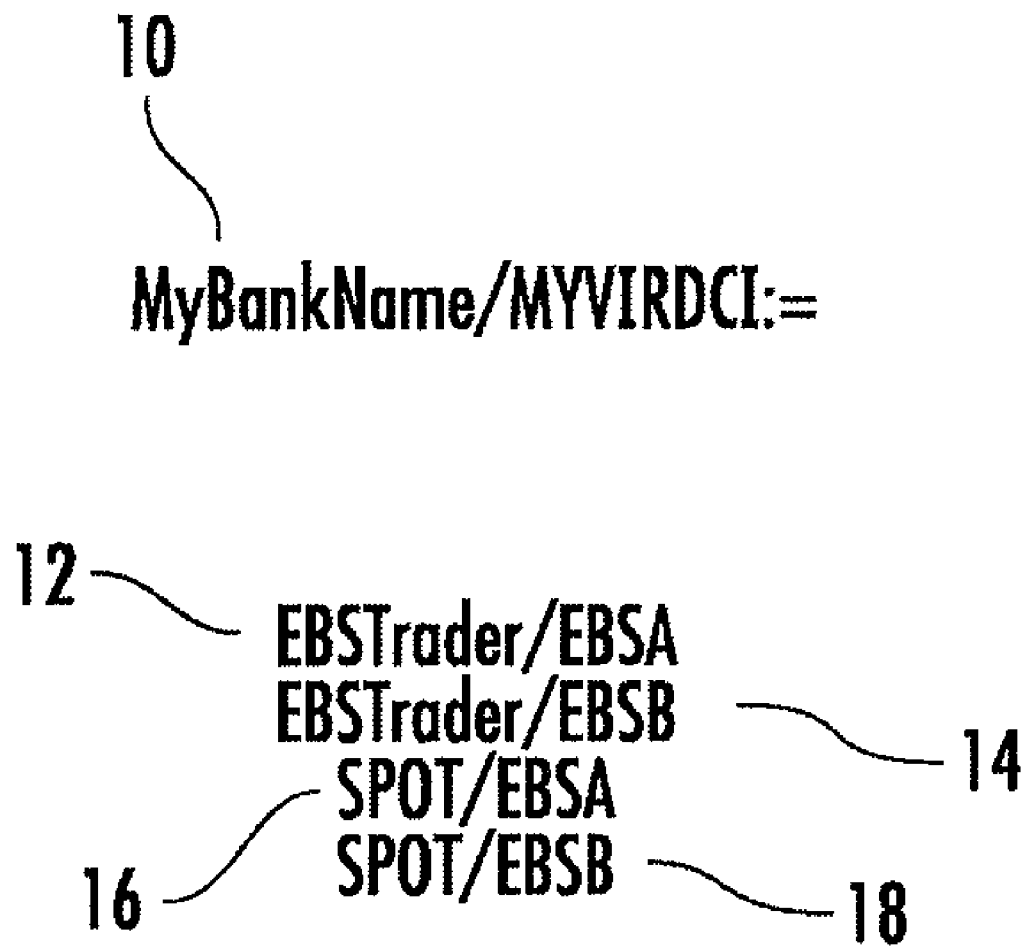
FIG. 1 is a schematic representation of a virtual deal code and its relation to actual deal codes.

FIG. 1 illustrates a virtual deal code embodying the principles of the invention. A virtual deal code is a super deal code that, logically, sits above all the real deal codes used by a bank's trading floors for all its trading systems. Thus, the virtual deal code is a label that is defined along with a set of real trading system/deal codes. In FIG. 1 the virtual deal code label is MyBankName/MYVIRDCI, 10 which represents a set of four real deal codes from two trading floors EBSA and EBSB. Each trading floor operates EBS Trader™, the conversational FX trading system operated by EBS, and EBS spot, the anonymous FX spot matching system operated by EBS. Thus there are four codes, each comprising the system and the floor: EBSTrader/EBSA 12; EBSTrader/EBSB, 14; SPOT/EBSA 16; and SPOT/EBSB 18.

Figure 2:
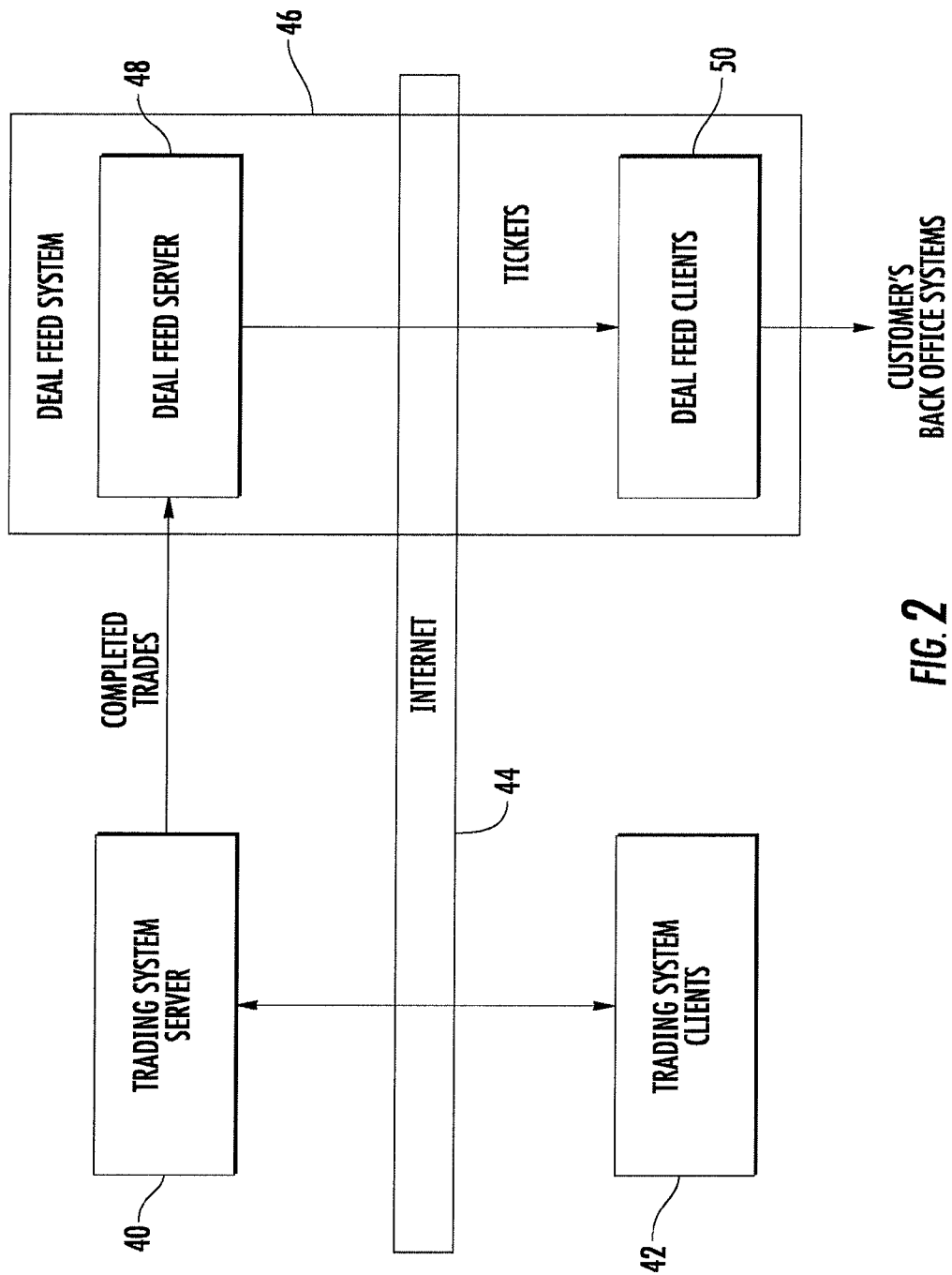
FIG. 2 shows, schematically, the relationship between a deal feed system and a trading system.

FIG. 2 shows a schematic view of how a deal feed system communicates with a trading system and customers. The trading system exchanges electronic messages with trading system clients 42 in known manner via a trading system server 40, shown in this case as being via the Internet 44. This is not necessarily the case. For example the EBS Trader® conversational dealing system communicates between clients 42 and server 40 via the Internet, whereas the EBS spot matching system mentioned above communicates via a dedicated communication network.

The exchange of messages between trading system clients 42 and server 40 results in deals being completed. Details of these deals, for example the parties, the deal amount, currency, settlement date etc. are passed by the trading system to the deal feed system 46. In the embodiment shown, the system is a client-server system with a central server 48 receiving completed trade data from the trading system server and turning that data into deal tickets which it distributes to the appropriate deal feed clients 50 via the Internet. Again, the system need not be Internet based. For any given deal there will be a maker and a taker and the deal ticket must be sent to both parties. The deal feed clients send the received deal tickets to their back office systems for settlement. The tickets can be retrieved either from the local clients or the deal feed server in case of any dispute as to the terms of a completed deal.

Figure 3:
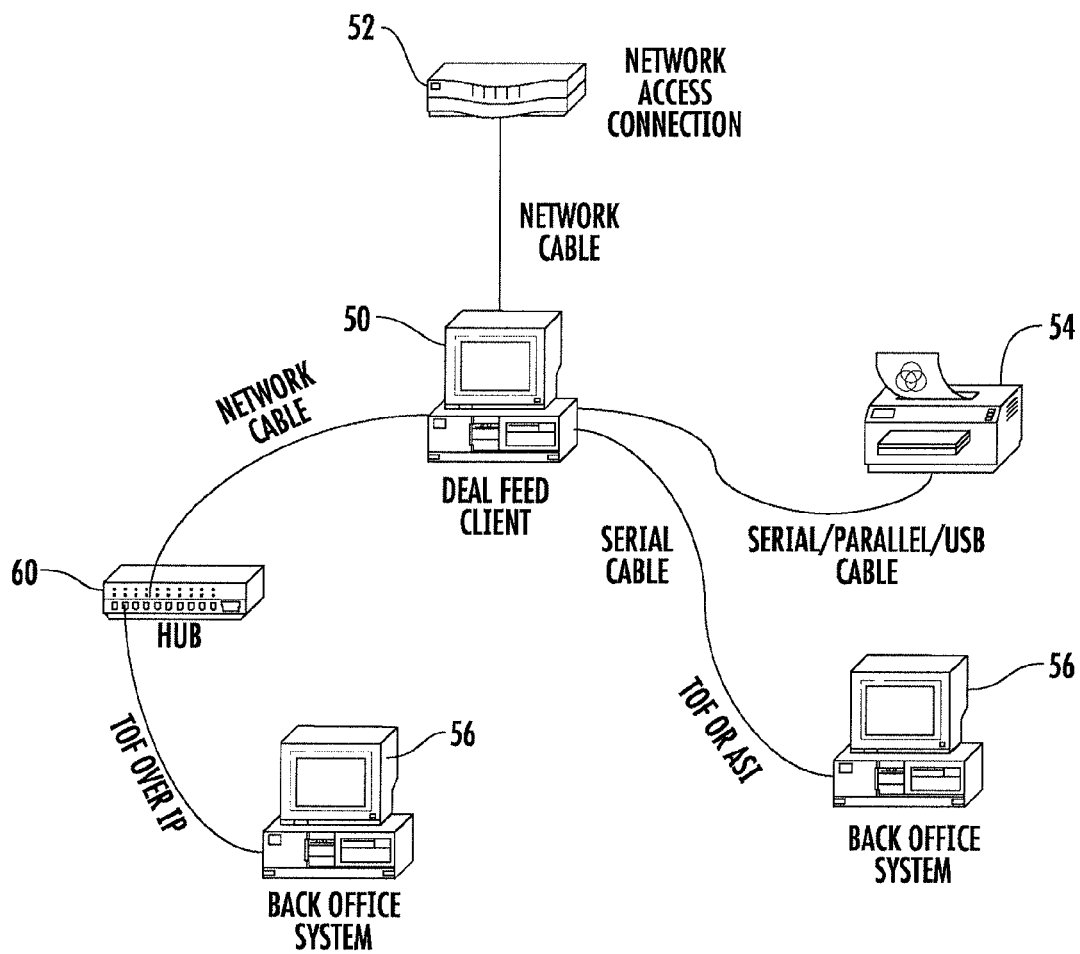
FIG. 3 shows the deal feed client of FIG. 2 is more detail.

FIG. 3 shows the deal feed client in more detail. The client may be a conventional workstation typically running an operating system such as Windows NT®. It is connected to the Internet for communication with the deal feed server 48 via a conventional network access connection 52 and has output to a printer 54 for printing deal tickets, via a serial, parallel or USB cable; and to the back office system 56 using one of the TOF, ASI or TOF over IP protocols. Both TOF and ASI require a serial connection 58 whereas TOF over IP requires a network connection to a hub 60 and then a connection into the back office system 56. Both TOF over IP and TOF/ASI are shown in the Figures but it will be understood that a given institution may not require all the variants.

Figure 4:
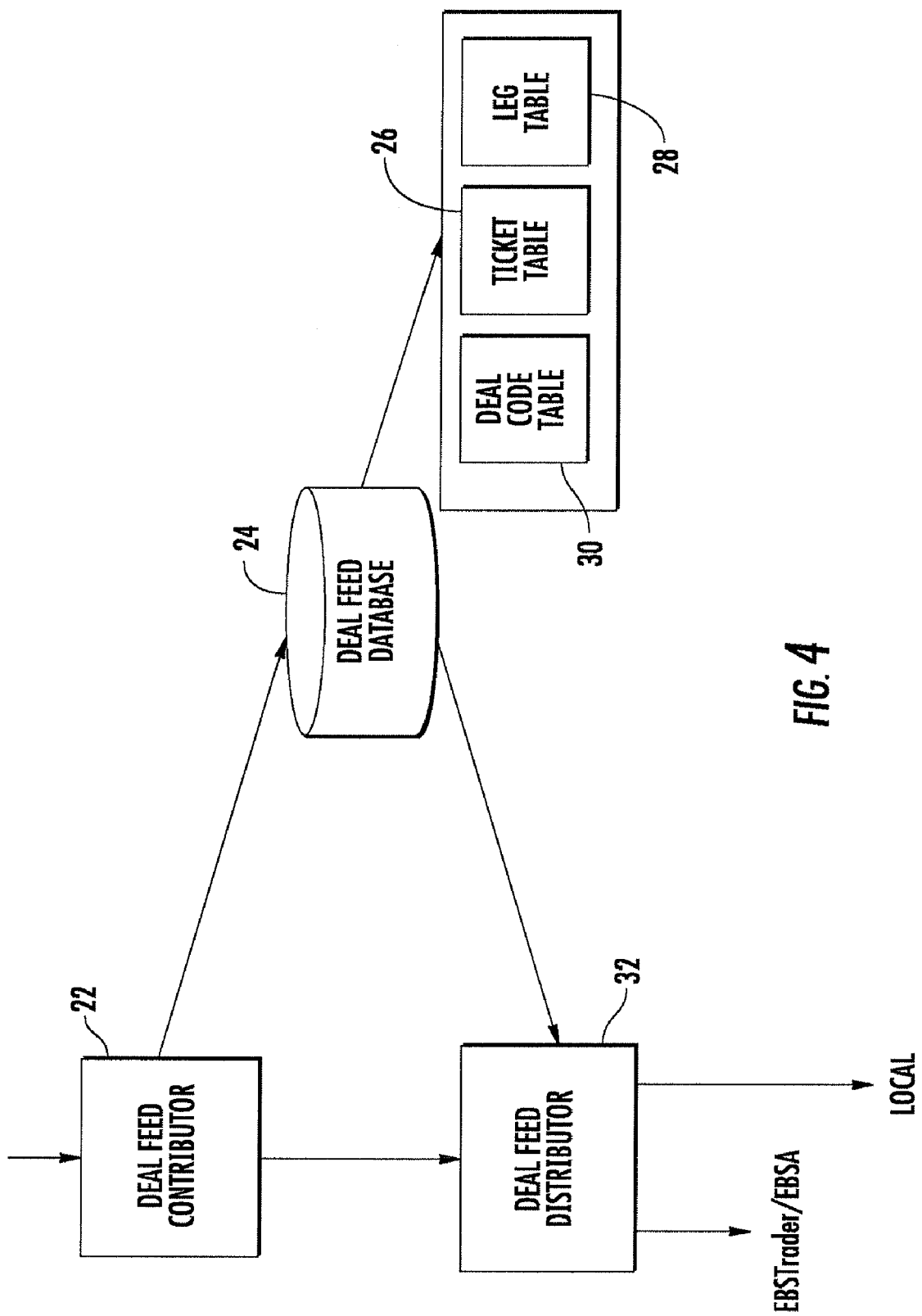
FIG. 4 is a schematic representation of a known deal feed system.

FIG. 4 shows a conventional known deal feed system used to feed deal tickets from a trading system, in this case the EBS Trader system at trading floor EBSA. The system comprises three main components on both the server and client sides: a deal feed Contributor 22 retrieves deal tickets, in this case from EBSTrader/EBSA. This may be performed on the client or on the server via an input adapter. The deal feed contributor may retrieve deal tickets from a number of sources. The second component is a deal feed Database 24 which stores deal feed tickets in a number of tables. A ticket table 26 holds the common ticket details; a leg table 28 holds leg information; and a deal code table 30 holds the deal range for EBSTrader/EBSA and is incremented each time a deal ticket is retrieved from that code. The third component is a deal feed distributor 32 that, on the server side, feeds deal feed tickets to the deal feed clients of the parties to the deal. Thus, a ticket is sent to EBS Trader/EBSA and to the counterparty to the trade the deal feed distributor takes its input from the deal feed contributor 22 and the deal feed database 24. On the client side the deal feed distributor output is the TDF/ASI or TOF over IP output and the printer output.

Figure 5:
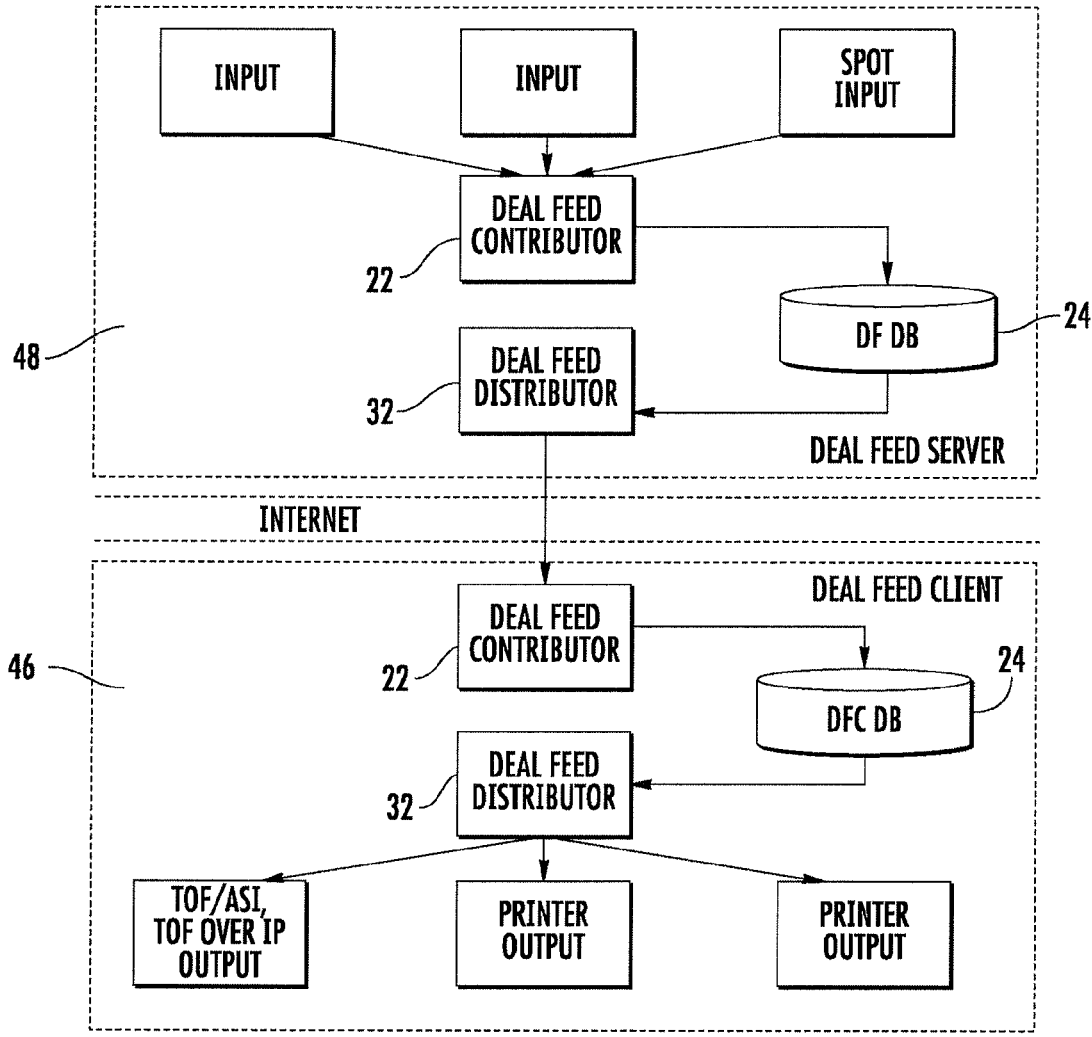
FIG. 5 shows, in more detail, the deal feed client and server architecture.

The mirroring of the architecture on the server and client sides is shown in FIG. 5.

The deal feed system provides storage and real-time notifications of new deal tickets as follows. When a deal is performed, say at EBSTrader/EBSA, the contributor 22 retrieves the ticket either on the client or the server. The deal is sent to the database 24 where common ticket details are written to the ticket table 26, leg information is written to the leg table 28 and the deal range for EBSTrader/EBSA is incremented in the Deal Code Table 30.

The Deal Feed Distributor is then informed of the updates to both the EBSTrader/EBSA and local deal ranges in real time and the deal distributor 32 then informs any clients subscribed to EBSTrader/EBSA and locally subscribed clients of the updates to the deal ranges.

This operation will now be described in more detail with reference to FIGS. 6 and 7 which show, respectively, how the deal feed contributor and distributor handle tickets. The deal feed contributor 22 connects to a client, which may be a trading system outputting deal tickets, or the deal feed server sending tickets to a deal feed client. The client then contributes tickets into the database, the contributor sends an acknowledgement response whereupon the client disconnects from the contributor.

Figure 6:
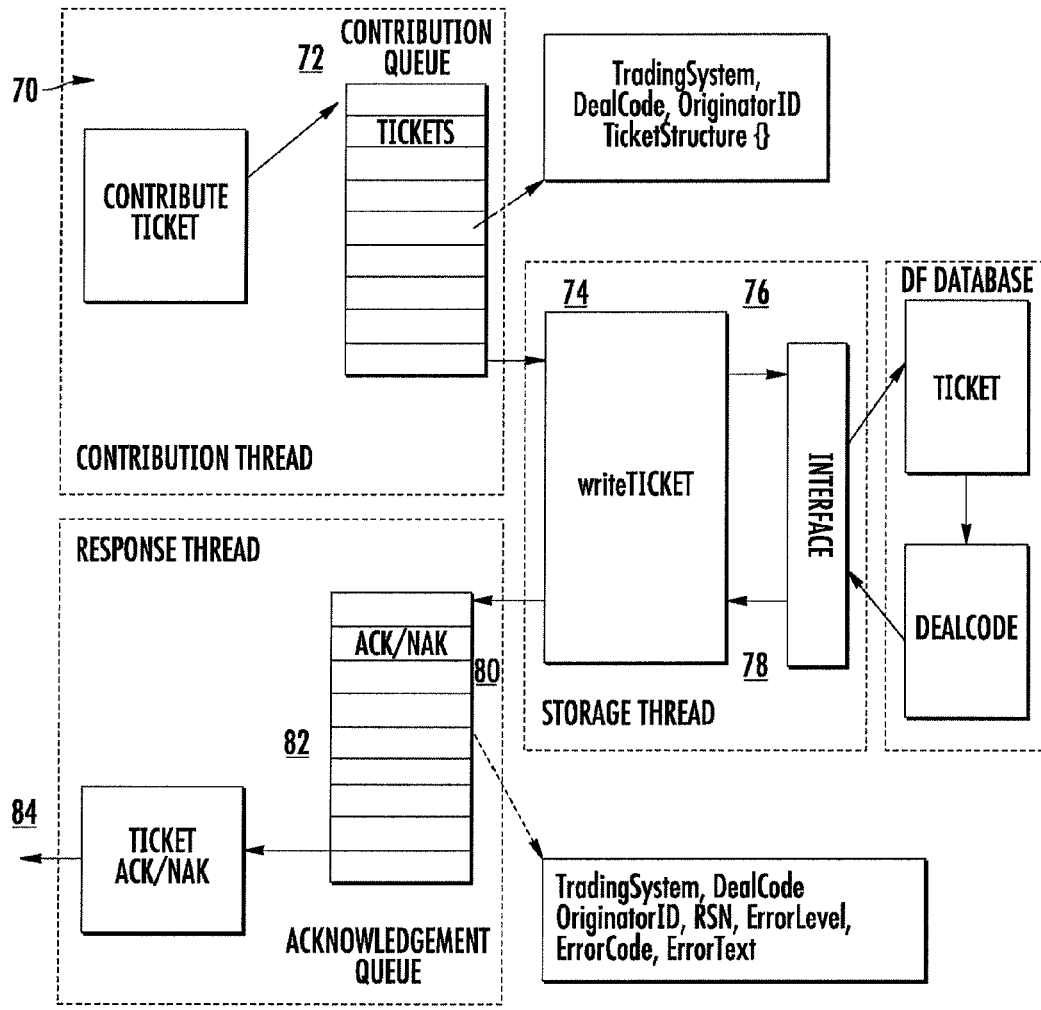
FIG. 6 shows the operation of the deal feed contributor.

As shown in FIG. 6, at step 70, the contributor client sends a contribute ticket message to the deal feed contributor 22. At the contributor, a contribution thread checks the message. At step 72, a validated ContributeTicket message is placed on a contribution queue. The messages on this queue will include the trading system 10, deal code, and originator ID as well as the ticket structure. At step 74 a storage thread takes tickets out of the contribution queue and at step 76 attempts to store them in the database 24 via an interface. If the ticket is stored successfully it will be allocated an RSN at step 78 or, if not, an error message will be returned. At step 80 the storage results are placed on an acknowledgement queue and at step 82 a response thread takes tickets from the acknowledgement queue and, if they have an RSN, at step 84, sends a contribution acknowledgement message back to the ticket contributor.

Figure 7:
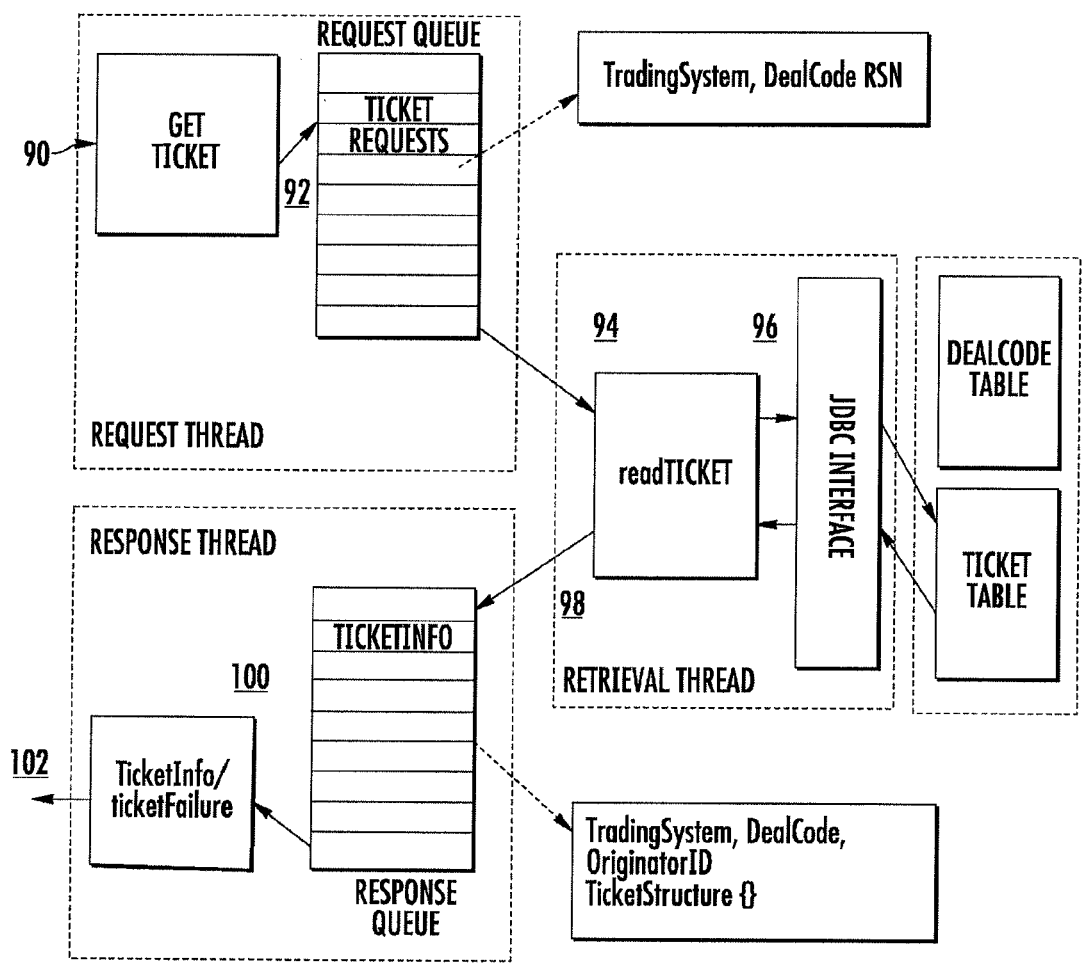
FIG. 7 shows the operation of the deal feed distributor.

FIG. 7 shows how the deal feed distributor retrieves tickets from the deal feed database. At step 90, a getTicket message is sent to the distributor. A request thread checks the message and, if validated, at step 92 places the request message on a request queue. At step 94 a retrieval thread takes requests off the queue and attempts to retrieve the ticket from the database using an interface at step 96. If the ticket is successfully retrieved it is added to a response queue. If not, a blank queue is placed in the queue with an error message. At step 98 the storage results are placed on the response queue and at step 100, a response thread takes tickets of the response queue and, at step 102, if they are not blank, returns a TicketInfo message to the client. If they are blank, a ticket failure message is sent.

Figure 8:
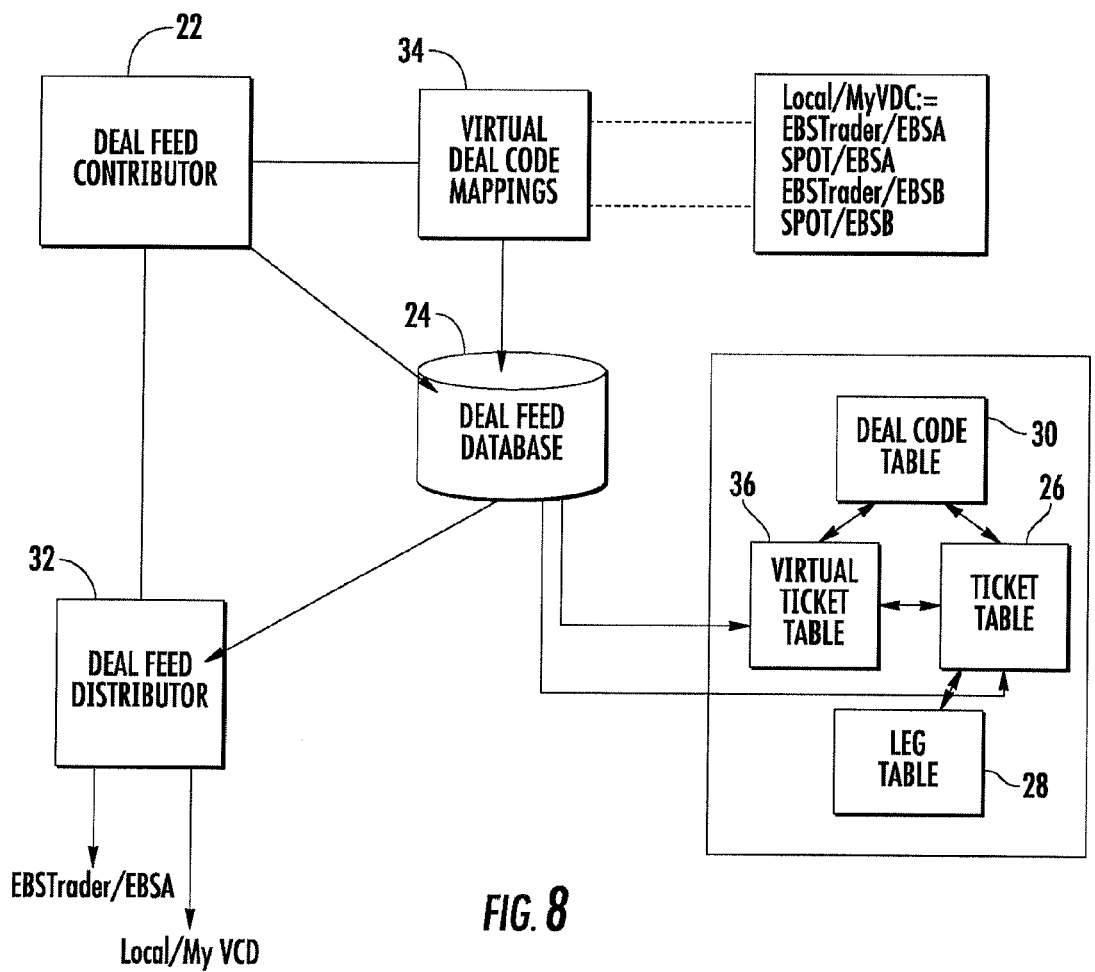
FIG. 8 is a schematic representation of the deal feed system of FIG. 5 modified to embody the invention.

FIG. 8 shows how the known system is modified in accordance with an embodiment of the invention. FIG. 8 is a modification of FIG. 4. The deal feed database is modified to include a virtual deal code mappings configuration 34. This is a storage device that stores a list of virtual deal codes and the actual deal codes that map to that virtual deal code. Thus, the virtual deal code Local/MyVDC stores EBSTrader/EBSA, EBSTrader/EBSB, SPOT/EBSA and SPOT/EBSB as the mappings for that virtual deal code. The database tables are supplemented by a virtual ticket table 36 which is written to whenever a ticket is received which is from a real deal code that maps to the virtual deal code.

The manner of operation of the modified system of FIG. 8 is similar to that described with respect to the known deal feed system. In addition, when a deal ticket is received at the deal feed contributor 22, the origin of that ticket, EBSTrader/EBSA is looked up in the Virtual Deal Codes Configuration 34 to determine whether there is a virtual deal code to which the actual deal code maps. If such a virtual deal code is found, the deal, in addition to being written to the deal code, ticket and leg tables 26, 28 and 30 is also written to the virtual ticket table 36. The entry at the virtual ticket table 36 will include the virtual trading system name, for example 'Local' and the Virtual Deal Code Name, for example 'MyVDC'. A reference to the ticket in the ticket table is also included with an RSN number within the Local/MyVDC deal range and in the deal code table 30 the deal range for Local/MyVDC is updated. In the ticket table, only the reference to the virtual ticket table is stored. There is no need to store the actual ticket details a second time.

As additional deals are retrieved by the deal feed contributor they are stored against their base Trading System/Deal Code, that is their actual deal code and are referenced against a virtual deal code in the virtual ticket table if such a virtual deal code is detected in the virtual deal code mappings configuration. Thus, if for example, the deal feed contributor retrieves 10 deals from each of EBSTrader/EBSA, SPOT/EBSA, EBSTrader/EBSB and SPOT/EBSB deal codes, each in their separate deal ranges, the Local/MyVDCI virtual deal code range would be indicating a range of 40 deals and the back office system which subscribes to the output of the deal feed distributor receives all 40 actual deal code data on the Local/MyVCD output whilst perceiving a single deal code. In the case of the Reuters TOF protocol, the multiple deal codes are perceived as a single TCID.

Thus, in the system described, local deal feed outputs at each trading system on each trading floor output deal data to the deal feed contributor. As the system includes a mapping of actual deal codes to virtual deal codes, the deal feed distributor can output the deal feed data from a number of actual deal codes as a single virtual deal code. This enables a bank's back office to receive deal tickets from all trading systems on all trading floors as a single input, removing the need for large amounts of cablings used by the prior art requirement for a single feed for each deal code/trading system pair.

As the virtual deal codes described may be used in the context of an existing deal feed system, virtual deal codes may be used with all existing adapters. Thus, the embodiment described has the advantage of being easy to implement with minimal additional expense.

Existing deal feed systems are client server systems with the clients being located at banks' trading floors. Virtual deal code functionality may be included at both the deal feed client and the deal feed server. This provides complete flexibility as between the system provider and the customer as to who manages the configuration of Virtual Deal Codes. The database on existing deal feed systems merely requires reconfiguration to include a new field in the Deal Code table for referencing to a new virtual ticket table. However, the actual deal ticket is only stored once on the client and the server. The virtual deal codes are no more than references to the existing ticket stored in the database.

The configuration of virtual deal codes is very flexible enabling customers to change the mappings of actual deal codes onto a virtual deal code. Thus, deal ranges can be added and removed. There is also no limit to the number of Trading System/Deal Codes that can be created and mapped to a single virtual deal code. Banks may, if they choose, present the same set of information combined in any number of Virtual Deal Codes.

The embodiment described allows banks to receive deals, and if appropriate, associated conversations, from multiple trading systems and deal codes using any of the systems adapters, such as TOF, ASI and TOF over IP through a single socket or serial connection, by using a single deal code, irrespective of the trading system or the trading floor where the deal was done. The Deal Feed System only transmits one deal code and provides a single ticket/RSN number to the client even though multiple trading systems and/or deal codes have been mapped to a single socket or serial connection.

Various modifications to the embodiment described are possible within the scope of the invention. For example, an institution may wish to set up a number of virtual deal codes, with each virtual deal code representing a number of floors trading on a single system. Thus, a first virtual deal code may represent all floors using an EBS conversational trading system and a second code for all trading floors using an EBS anonymous matching system.

The invention is not limited to the use of virtual deal codes within the specific deal feed system described. The concept of virtual deal codes may be implemented in a variety of different ways in various different types of deal feed systems all of which are within the scope of the invention.

What is claimed is:

1. A deal feed system for transmission of deal information relating to trades conducted by trading entities on a plurality of trading systems to back office systems, the system comprising: one or more programmed computers, said one or more computers cooperating to:
    receive electronic deal tickets, each electronic deal ticket including information relating to a trade made by two trading entities, each deal ticket including a deal code identifying one of the trading entities that made the trade and the electronic trading system on which the trade was made;
    storing a map relating a plurality of the deal codes for a given trading entity to a single virtual deal code for that trading entity so that a plurality of deal tickets having different deal codes identifying the given trading entity are associated with a single virtual deal code; and
    outputting to the given trading entity a series of electronic deal tickets associated with the virtual deal code.

2. The system according to claim 1, wherein the deal feed system is a client server system and the virtual deal code for the given trading entity is stored at the client side of the system.

3. The system according to claim 1, wherein the deal feed system is a client server system and the virtual deal code for the given trading entity is stored at the server side of the system.

4. The system according to claim 1, wherein the one or more computers include a deal feed distributor for outputting the series of electronic deal tickets to a back office system.

5. The system according to claim 4, wherein the virtual deal code comprises a virtual trading system name and a virtual deal code name.

6. The system according to claim 4, further comprising a deal feed contributor for receiving electronic deal tickets from the plurality of trading systems, and a database for storing the received electronic deal tickets with a reference to their virtual deal codes.

7. The system according to claim 6, wherein the database includes a virtual deal ticket map.

8. The system according to claim 7, wherein the database includes an electronic deal ticket table for identifying stored received electronic deal tickets, wherein virtual deal codes are stored in the virtual deal ticket table with a reference to the tickets stored in the ticket table.

9. The system according to claim 8, wherein the database comprises a deal code table for storing the deal codes of received deal tickets with their ticket ranges, the virtual ticket table and the deal code table being arranged such that the deal code table can be updated with the range of the virtual deal code.

10. The system according to claim 1, wherein the trading systems comprise electronic trading systems.

11. The deal feed system of claim 1, wherein each of the electronic deal tickets has a unique identifier and each trading entity is associated with a plurality of virtual deal codes, each associated virtual deal code being associated with a different range of unique identifiers.

12. The deal feed system of claim 11, wherein the unique identifiers are numbers.

13. The deal feed system of claim 12, wherein the ranges are sequential ranges of numbers.

14. The deal feed system of claim 1, wherein the given trading entity is associated with a plurality of trading floors and wherein the deal code for each associated trading floor is different.

15. The deal feed system of claim 14, wherein the virtual deal code for the given trading entity is associated with the deal codes for a plurality of associated trading floors for that trading entity.

16. A method of distributing deal information relating to trades conducted by trading entities on a plurality of trading systems, each trading entity having a deal code unique to the trading entity and the system on which the trade is made, the method comprising:
    mapping with one or more computers a plurality of the deal codes for a given trading entity to a single virtual deal code for that trading entity so that a plurality of deal tickets having different deal codes identifying the given trading entity are associated with the single virtual deal code;
    storing the single virtual deal code in the one or more computers, the single virtual deal code having an associated deal range, wherein the deal information is provided as an electronic message; and
    distributing the deal information as a function of the single virtual deal code.

17. A method of distributing deal information relating to trades conducted by trading entities on a plurality of trading systems, each trading entity having a deal code unique to the trading entity and the system on which the trade is made, the method comprising:
    mapping with one or more computers a plurality of the deal codes for a given trading entity to a single virtual deal code for that trading entity so that a plurality of deal tickets having different deal codes identifying the given trading entity are associated with the single virtual deal code;
    storing the single virtual deal code in the one or more computers, the single virtual deal code having an associated deal range, wherein the trading systems are electronic trading systems; and
    distributing the deal information as a function of the single virtual deal code.

* * * * *